April 11, 1961   J. F. MARSHALL   2,979,658
SWITCHING CIRCUIT
Filed Dec. 26, 1957

INVENTOR.
JAMES F. MARSHALL
BY
*Warren A. Sturm*
ATTORNEY

United States Patent Office 2,979,658
Patented Apr. 11, 1961

2,979,658
SWITCHING CIRCUIT
James F. Marshall, Hopkins, Minn., assignor to Minneapolis-Honeywell Regulator Company, Minneapolis, Minn., a corporation of Delaware Filed Dec. 26, 1957, Ser. No. 705,321
3 Claims. (Cl. 324—115)

This invention relates generally to electrical switching circuits and is more particularly directed to a method of switching impedances connected in parallel with a load device whereby the effect of contact resistance of the switching means is minimized.

In the prior art, at least two methods of switching the value of impedance means connected in shunt with a load device, such as a meter, are in common use. The first includes the resistance of the contacts of the switching means in the circuit that includes the load device. In the second, a system commonly known as the loop shunt connection, the contact resistance of the swiching means remains external to the circuit of the load device but, in order to retain accuracy in the shunting impedance, a high degree of accuracy is required for the individual impedance connected in the loop. It is also well known to those skilled in the art that the effect of contact resistance may be substantially reduced in any of the systems by the use of expensive precision switching apparatus.

In my invention, I provide a method and apparatus for switching between various impedances connected in parallel with a load device that minimizes the effect of contact resistance and allows one to use an inexpensive, readily obtainable component for doing so.

It is therefore an object of my invention to provide a method of switching impedances in parallel with a load device that substantially minimizes the effect of contact resistance of the switching means.

It is a further object of my invention to provide a method and apparatus for use with a current measuring device that increases the accuracy of operation by minimizing the error resulting from contact resistance of the switching means and reduces the cost of equipment by allowing for the use of inexpensive components.

Figure 1:
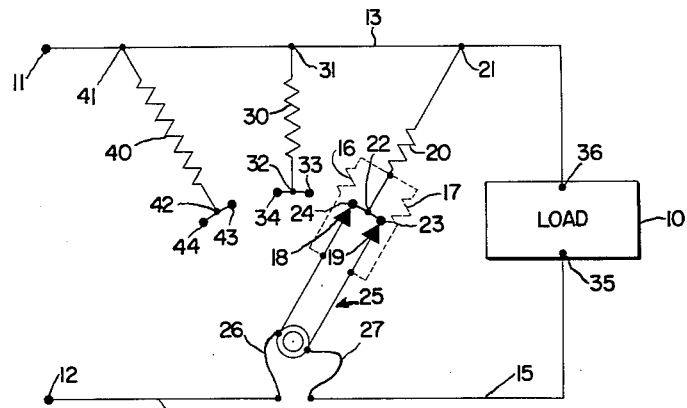
Figure 2:
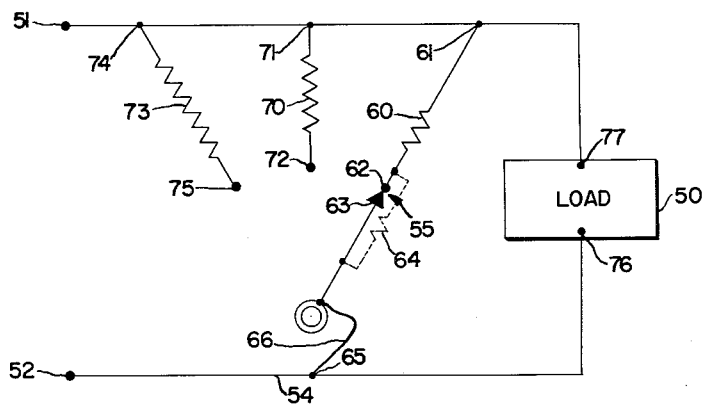

Other objects and advantages of my invention will become apparent from a reading of the appended specification, claims and drawing, in which:

Figure 1 is a schematic drawing of an electrical circuit embodying the principles of my invention; and Figure 2 is a schematic drawing of one of the circuits utilized in the prior art.

Referring now to Figure 1, there is shown a load device 10, a plurality of impedance means 20, 30 and 40 adapted to be connected in parallel with load device 10, a switching mean 25 adapted to connect impedance means 20, 30 and 40 in parallel with load 10, and a pair of input terminals 11 and 12 adapted to be energized by a source of electrical energy.

Load device 10, which may be an energy measuring device such as an ammeter, has a pair of terminals 35 and 36. Terminal 35 is connected to a conductor 15 and terminal 36 is connected to a conductor 13. Switching means 25 includes a pair of movable contacts 18 and 19 and a plurality of pairs of stationary contacts 23 and 24, 33 and 34, and 43 and 44. The resistors 16 and 17, shown connected in parallel with the movable contacts 18 and 19 respectively, are a schematic representation of the contact resistance existing between the movable contacts and the stationary contacts to which they are applied. Resistor 20 has terminal 21 connected to conductor 13 and a further terminal 22 connected to the pair of stationary contacts 23 and 24. Resistor 30 has a terminal 31 connected to conductor 13 and a further terminal 32 connected to stationary contacts 33 and 34. Resistor 40 has a terminal 41 connected to resistor 13 and a further terminal 42 connected to stationary contacts 43 and 44. A pair of input terminals 11 and 12 are provided for further connection to a source of electrical energy. Input terminal 11 is connected to terminal 36 on load 10 through lead 13, and input terminal 12 is connected to input terminal 35 on load 10 through lead 14, lead 26, movable contact 18, stationary contact 24, stationary contact 23, movable contact 19, lead 27 and lead 15. Also present in the last named circuit are the contact resistances or the contacts represented by resistors 16 and 17 respectively. It is seen, that the load device 10 may be shunted by any one of the plurality of shunting resistors 20, 30 or 40 by the operation of switching means 25.

Operation of Figure 1

Assuming for the moment that the load device 10 is an ammeter, it may be readily understood by one skilled in the art that it would be highly desirable to eliminate the effect of the contact resistance of the switching means 25, represented by resistors 16 and 17, so that a highly accurate reading of the actual current flowing through the circuit to which input terminals 11 and 12 are connected may be obtained. This is accomplished by placing the contact resistance 16 external to the circuit that includes the ammeter, that is the circuit that may be traced from terminal 36 on load device 10 through conductor 13, terminal 21, resistor 20, terminal 22, stationary contact 23, movable contact 19 and contact resistance 17, lead 27, lead 15, and terminal 35 on load device 10. Therefore the effect of the resistance 16 of contacts 18 and 24 is external to the load, or meter circuit. On the other hand, since the load, or meter 10, usually has a substantial value of resistance or impedance, compared to the resistance 17 of contacts 19 and 23, the effect of the resistance of contacts 19 and 23, appearing in the load or meter circut, upon the energy supplied to the load is substantially reduced to a minimum, negligible amount. Furthermore, the effect of a change in the contact resistance 17 of contacts 19 and 23, as is illustrated below, is reduced to a minimum value so that increased resistance due to oxidation of the contacts, for instance, will have substantially no effect in the load circuit on successive operations of the impedance changing switch.

One example of the magnitude of error that may occur with the method of my invention may be illustrated as follows: assuming that the load device 10 has a resistance of 1000 ohms, and that the contact resistance 17 has a nominal value of .1 ohm, a 100% change in the value of contact resistance 17 will cause a change in the voltage drop across the load device 10 of less than $\frac{1}{100}$ of one percent. It will be apparent to one skilled in the art that the relative values of the shunt impedances and load impedance will, to some extent, determine the ultimate effect that a variation in contact resistance 17 or contacts 19 and 23 will have on the energy flowing to load device 10.

Figure 2

Figure 2 shows one of the prior art arrangements as noted above.

The prior art arrangement of Figure 2 includes a load device 50 having a pair of terminals 76 and 77, input terminals 51 and 52 adapted to be connected to a suitable source of energy, a conductor 53 interconnecting terminal 77 on load device 50 to input terminal 51 and a conductor 54 interconnecting terminal 76 on load device 50 to input terminal 52. A switching means 55 is provided for selectively connecting one of a plurality of shunting resistors 60, 70 and 73 in parallel with the load device 50. Switching means 55 includes a plurality of stationary contacts 62, 72 and 75, a movable contact 63, and a resistor 64 representative of the contact resistance existing between stationary contacts 62, 72 and 75 and movable contact 63. Resistor 60 is connected to conductor 51 at terminal 61 and to stationary contact 62. Resistor 70 is connected to terminal 71 and conductor 53 and to stationary contact 72 and resistor 73 is connected to terminal 74 and conductor 53 and to stationary contact 75. Movable contact 63 on switching means 55 is connected to conductor 54 at terminal 65 through lead 66.

Operation of Figure 2

The operation of Figure 2 is readily apparent to one skilled in the art and it should also be apparent to one skilled in the art that the contact resistance represented by resistor 64 is included in the parallel shunt for load device 50 in such a manner as to substantially effect the flow of energy therethrough and that a small change in its value will have a proportionately large change in the value of the energy flowing through the parallel circuit including the shunting resistor 60, stationary contact 62, movable contact 63 and contact resistor 64.

It is to be understood that various changes and modifications may be made without departing from the spirit and scope of my invention.

What is claimed is:

1. Apparatus for connecting a relatively low impedance shunt in a parallel electrical circuit with a relatively high impedance load, comprising; a pair of input terminals, a pair of output terminals adapted to be connected to the relatively high impedance load, circuit means connecting one of said input terminals to one of said output terminals; switching means having a plurality of stationary contacts and a first and a second movable contact, said first and second movable contacts being insulated from each other and being constructed and arranged to both simultaneously engage a selected one of said stationary contacts; a plurality of relatively low impedance means having one terminal thereof connected to said circuit means and each having the other terminal thereof connected to a separate one of said stationary contacts; means connecting said first movable contact to the other of said input terminals, and means connecting said second movable contact to the other of said output terminals.

2. A multi-range current meter comprising; first and second input terminals for connection to a source of current; current responsive indicating means having first and second terminals, said indicating means having a relatively high impedance; means interconnecting said first input terminal and said first indicating means terminal; a plurality of impedance devices of substantially low impedance with respect to said indicating means, each of said impedance devices having a first terminal connected to said first input terminal and having a second terminal; switching means having first and second movable contacts, said first and second movable contacts being electrically insulated from each other and being mechanically mounted for movement as a unit; means connecting said first movable contact to said second input terminal, means connecting said second movable contact to said second indicating means terminal; and means associated with said switching means for selectively and simultaneously connecting both of said movable contacts to the second terminal on a selected one of said impedance means, so that the effect of contact resistance of said switching means is substantially reduced.

3. Apparatus for substantially reducing the effect of variations in contact resistance in the switching of shunting impedances for electrical energy utilization devices comprising; first and second input terminals; first and second output terminals for connection to an electrical energy utilization device of relatively high impedance; a plurality of impedance means of intermediate impedance, each having a first and a second terminal; means interconnecting said first input terminal, said first output terminal, and said first terminals of each of said impedance means; switching means having a plurality of stationary contacts and a first and a second movable contact, said first and second movable contacts being insulated from each other and being constructed and arranged to both simultaneously engage a selected one of said stationary contacts; said contacts being of relatively low impedance; means connecting said second terminal of each of said plurality of impedance means to a different one of said stationary contacts; means connecting said first movable contact to said second input terminal; and means connecting said second movable contact to said second output terminal.

References Cited in the file of this patent

UNITED STATES PATENTS

| | | |
|---|---|---|
| 1,901,343 | Eastham | Mar. 14, 1933 |
| 2,381,768 | Minneci | Aug. 7, 1945 |
| 2,449,367 | Boyajian | Sept. 14, 1948 |